US00RE36463E

United States Patent [19]

Jarvis

[11] E Patent Number: Re. 36,463

[45] Reissued Date of Patent: Dec. 28, 1999

[54] FLOAT MEANS

[76] Inventor: Jack D. Jarvis, 3204 Periwinkle, Memphis, Tenn. 38127

[21] Appl. No.: 08/970,937

[22] Filed: Nov. 14, 1997

Related U.S. Patent Documents

Reissue of:

[64] Patent No.: 5,467,496
Issued: Nov. 21, 1995
Appl. No.: 08/095,581
Filed: Jul. 19, 1993

[51] Int. Cl.[6] ..... E01C 19/22; B05C 17/10

[52] U.S. Cl. ..... 15/235.8; 15/235.4; 404/97

[58] Field of Search ..... 15/235.4, 235.5, 15/235.6, 235.8; 404/97, 98; 425/458

[56] References Cited

U.S. PATENT DOCUMENTS

| | | | |
|---|---|---|---|
| 1,021,557 | 3/1912 | Runner | 15/235.8 |
| 1,168,643 | 1/1916 | Johnson | 15/235.4 |
| 1,544,368 | 6/1925 | Brennan | 15/235.4 |
| 1,713,513 | 5/1929 | Abram | 15/235.8 |
| 1,763,066 | 6/1930 | Rooney | 15/235.8 |
| 2,834,199 | 5/1958 | Freeman | 15/235.8 |
| 3,729,765 | 5/1973 | Peterson | 15/235.8 |
| 3,936,210 | 2/1976 | Oehlerking | 15/235.4 |
| 4,397,581 | 8/1983 | Jarvis | 15/235.8 |
| 4,399,583 | 8/1983 | Jarvis | 15/235.8 |
| 4,431,336 | 2/1984 | Nightengale | 404/97 |
| 4,663,796 | 5/1987 | Helling | 15/235.8 |
| 4,722,637 | 2/1988 | Glesmann | 404/97 |
| 4,766,635 | 8/1988 | De Vitis | 15/235.4 |
| 4,856,932 | 8/1989 | Kraft | 404/97 |
| 4,892,437 | 1/1990 | Kraft | 404/97 |
| 5,115,536 | 5/1992 | Jarvis | 15/235.8 |

*Primary Examiner*—Randall E. Chin
*Attorney, Agent, or Firm*—Paul M. Denk

[57] ABSTRACT

An improved float, of the category of a bull float or a hand float, incorporating a body portion, and which cooperates with a reinforcing brace, which when fastened or locked into position upon the upper surface of the float, resist against twisting, bending, or warpage to the float, as a result of the sustained usage, or exposure to the extreme elements; various types of handles may be applied to the float, through the usage of a tee slot formed upon the plate portion of the float, and handles of various sizes may be accommodated upon the float, and in particular the hand float, through the alignment of selected apertures along the length of the float for accommodating fasteners for securement of the selected length of handle to the float in preparation for its usage.

16 Claims, 5 Drawing Sheets

FLOAT MEANS

Matter enclosed in heavy brackets [ ] appears in the original patent but forms no part of this reissue specification; matter printed in italics indicates the additions made by reissue.

BACKGROUND OF THE INVENTION

This invention relates generally to float means, and more specifically to the provision of structural means to various components of a concrete float for facilitating the attachment of a handle thereto, and to resist bending and other distortions that are experienced by the concrete finishing float during repeat usage.

Various types of float means, for use for finishing concrete and related materials, have long been available in the art. The applicant's own U.S. Pat. No. 4,397,581, upon a combination groover, trowel and bull float, discloses one such example of a variety of floats, incorporating technology to improve and enhance their functioning, during repeated usage by the contractor. Another patent to the applicant herein, U.S. Pat. No. 4,399,583, discloses a hand float, which is of the type used by the concrete finisher, for finishing the surface of concrete, from a more proximate location, through the direct manual efforts of the contractor. In addition, the U.S. Pat. No. 5,115,536, upon an adjustable concrete finishing tool, discloses another invention of the inventor herein, and shows further improvements to a concrete finishing tool, in this particular instance, primarily comprising a bull float, wherein remote adjustment may be obtained for the float, during its application and usage.

The current invention improves upon the features of these previous developments, for providing means for resisting the heat warping and distortion that may occur as a result of exposure to tools of this type to sunlight, and particularly the heat of summer, and likewise, provides means for furnishing a quick adjustment to the various handle means that may be accommoated by the tool, and its reinforcing brace, through usage of the principles of this current improvement.

SUMMARY OF THE INVENTION

This invention defines various float means, and whether they be of the bull float or hand float type, that may be fabricated to incorporate various structural features that enhance the utilizing of their application and usage. In the primary instance, the float means involved is a bull float, and which incorporates means for facilitating its usage and application, such as for providing contoured features upon the plate portion of the float, to enhance its useful application. In addition, the plate portion of the float includes a series of ridges or upstanding ribs, and which cooperate with a reinforcing brace, that extends substantially correspondingly over the length of the plate portion of the float, and likewise, has a width of at least approximately half the width of the float, or more, so that once the reinforcing brace is tightened into location, against the upper surface of the float, it has a tendency to aid the float in resisting against any warping or distortions, that may be exerted as a result of its pressure application, prolonged storage, or through heat warpage, so that the contractor can be assured that the float will sustain its total alignment, and provide an attractive finish to the surface of any concrete that has been poured and smoothed during finishing.

The invention further envisions the usage of a tee slot, integrally formed upon the upper surface of the plate portion of the float, and which can accommodate fasteners for securing and tightening of the reinforcing brace against the upper surface of the float, in preparation for its installation and usage. The same slot may accommodate other fasteners for holding handle means, and whether it be of the elongated handle, or a hand held handle, to assure that rigidity will be provided to these components, in their installation within the bull float, and for that matter, the hand float, in preparation for their active usage. Also, such structural relationship allows for the adjustment of the handle to various locations along the length of the float.

A further embodiment of the invention envisions the interconnection between the reinforcing brace, and the upstanding ridges of the float, such that the ridges may be provided for accommodating and positioning the flanges of the reinforcing brace into proper alignment upon the upper surface of the plate portion of she float, when assembled for usage and application. Furthermore, the flanges of the reinforcing brace may interconnect with the upstanding ridges, whether it be by a detent type of engagement, or through the usage of a barbed connection, or further providing for a pivotal connection, as for example, along one side and flange of the reinforcing brace, while the opposite flange may interlock and engage with its contiguous rib to provide for interconnection of the brace with the plate portion during assembly. Once tightened into position, through the applicaton of fasteners within the accompanying tee slot of the plate portion, the brace functions to maintain the surface alignment of the float, once assembled, and to assure that such alignment sustains even after repeat usage of the float, and its subsequent storage, whether it be during extremes of weather, as in the heat of summer, or the cold of winter, to assure against its warping, twisting, or even any distortion that may be caused due to prolonged storage, such as may occur when an item of this type is stored in a warehouse, and has other weighty tools rested upon it.

Hence, it is the principal object of this invention to provide a reinforcing brace for use in combination with a float means, to assure its permanent alignment even after repeat usage, applications, or prolonged storage.

Another object of this invention is to utilize and provide a reinforcing brace for use in conjunction with a bull float.

A further object of this invention is to provide a form of reinforcing brace for use in combination with hand float.

Still another object of this invention is to provide a reinforcing brace that may be interconnected upon the upper surface of the plate portion of a float, and interlocked together as during assembly in preparation for usage.

Still another object of this invention is to provide means for contouring at least the perimeter edges of a bull float, so as to assure that no lines will be embedded into the concrete surface during performance of a finishing function through usage of the bull float of this invention.

Still another object of this invention is to provide a hand float, having a handle means applied thereto, and interconnecting a series of aligned apertures therein, so that handles of differing .sizes may be accommodated by the hand float when it becomes necessary to interchange another handle onto the float in preparation for continuing usage.

These and other objects will become more apparent to those skilled in the art upon reviewing the summary of this invention, and upon a study of the description of the preferred embodiment, in view of the drawings.

DESCRIPTION OF THE PREFERRED EMBODIMENTS

Figure 1:
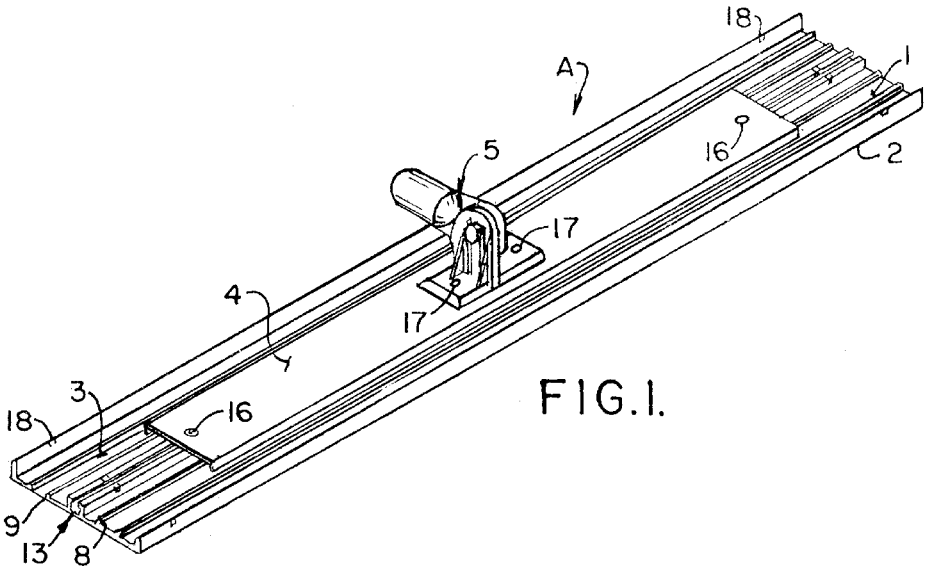
FIG. 1 provides an isometric view of the bull float of this invention, with the elongated handle being broken away for convenience.

In referring to FIG. 1, the improved float means of this invention is disclosed at A, which in this particular instance comprises a bull float, and which includes a plate portion 1, having a bottom surface, as at 2, and which is useful for application upon a freshly poured concrete surface, for use for finishing and smoothing out the surface of the same. The plate portion 1 also includes an upper surface, as at 3, with the entire plate portion having substantial length, which may be anywhere from two to six feet in length, and having a width approximating eight inches or more, to provide a Substantial undersurface for smoothing out and finishing a concrete surface, during its application and maneuvering. Provided connecting onto the upper surface of the plate portion 1 is a reinforcing brace 4, and this particular brace is useful for achieving the results as previously explained, to function as a brace against the surface of the substantially sized plate, to prevent its twisting and distortion, including warping, when exposed to stressful conditions, during application, or when stored, or when exposed to sunlight, during the summer months, or substantially cold weather, as during the wintertime. These extremes of temperatures, and weather conditions, can cause some distortion and warpage to the plate portion of the bull float, which can lead towards imperfect results when subsequently used for finishing a concrete surface. In addition, it can be seen that a handle means 5 may be provided mounted upon the bull float, and more specifically upon its reinforcing brace 4, and provide the instrument for manipulation of the float during its usage and application by the concrete finisher.

Figure 2:
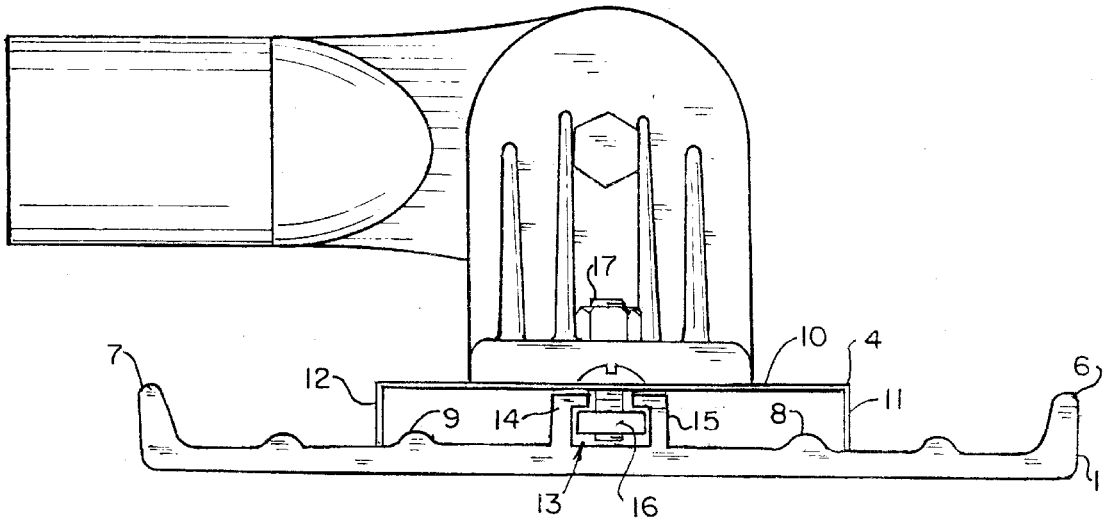
FIG. 2 provides a left side view of the bull float of FIG. 1.

As can be seen in FIG. 2, the plate portion 1 of the bull float includes a pair of upstanding front and rear edges, as at 6 and 7, respectively, and which are useful for facilitating the movement of concrete around the surface of the freshly poured concrete, during its finishing function. Also, formed extending upwardly from the surface of the plate portion 1 are a series of ridges, as can be seen at 8 and 9, and these ridges, which extend substantially parallel with a length of the float, as can also be seen in FIG. 1, are useful for cooperating with the reinforcing brace for assuring its convenient positioning, along the upper surface of the plate portion of the bull float, during its installation. As can be further seen, the reinforcing brace 4 includes an upper wall 10, having integral flanges 11 and 12 extending downwardly along its front and rear edges, generally along the length of the same, and which cooperates with the upstanding ridges 8 and 9 for assuring the locating of the brace, upon the plate portion, when the bull float is assembled for usage. As can further be seen in FIG. 2, a tee slot, as at 13, is formed by a pair of upstanding flanges 14 and 15, and this tee slot generally extends likewise along the length of the float, and is disposed for accommodating various fasteners therein, not only to secure the reinforcing brace into position upon the upper surface of the float, hue likewise to cooperate with the fasteners that secure the handle means 5 to the float, in preparation for its usage. The type of fasteners for holding the reinforcing brace upon the float can be seen at 16, while the fasteners for securement of the handle means 5 into position, can be seen at 17.

The combination of FIGS. 1 and 2 disclose that reinforcing brace 4 extends a substantial length over the surface of the float, and ends just short of the length of float, so that the reinforcing brace 4, once its fasteners 16 are loosened, can be shifted along the length of the float, to a position where desired. This can be done for the convenience of the user, and also to provide clearance, where such may be required. Furthermore, as can be seen in FIG. 2, the reinforcing brace 4 , and its integral flanges 11 and 12, extend from the center of the plate outwardly approximately to at least the midpoint of each half of the plate portion 1 of the float, so as to assure that adequate pressure can be applied at the outer limits of the brace, upon the bull float, to assure that it remains distortion and warpage free.

Figure 3:
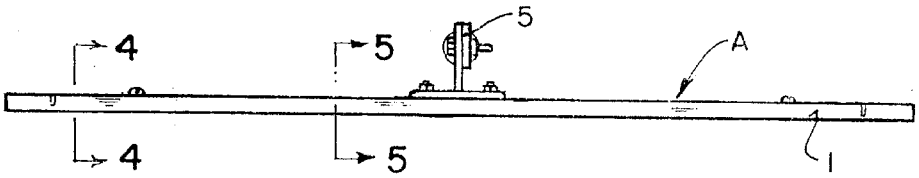
FIG. 3 is a front view of the bull float of FIG. 1.
Figure 4:
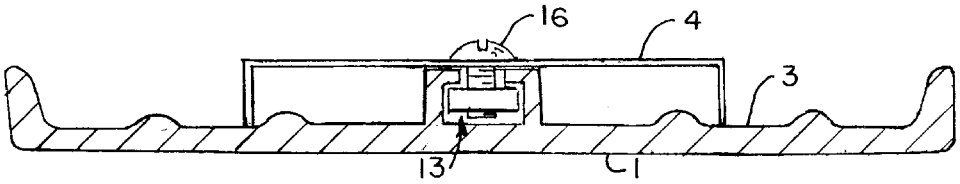
FIG. 4 is a sectional view taken along the line 4—4 of FIG. 3.
Figure 5:
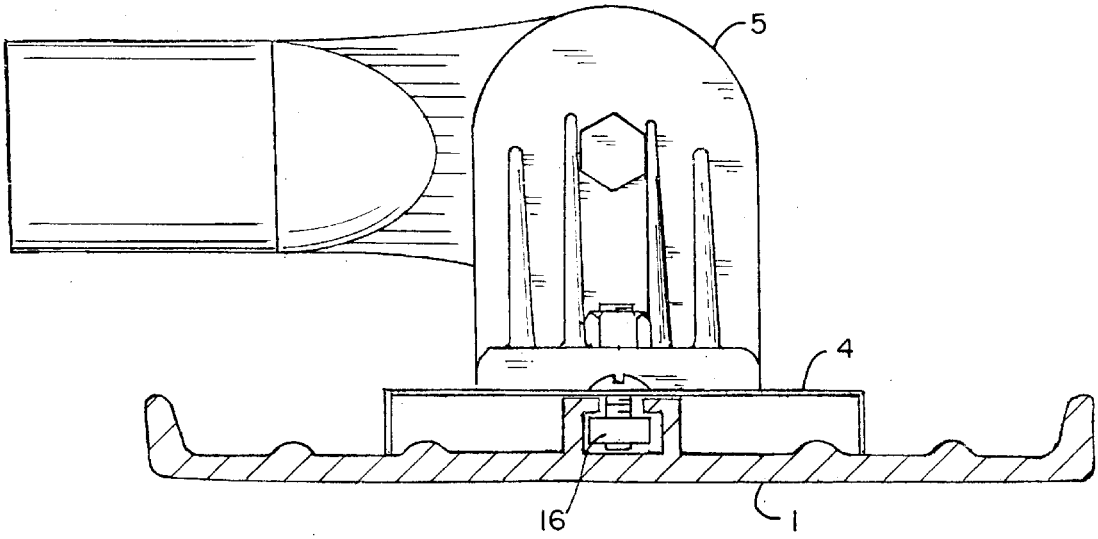
FIG. 5 is a sectional view taken along the line 5—5 of FIG. 3.

FIG. 3 discloses a front view of the bull float A, and shows how the handle means 5 is located, normally, at the approximate midpoint of its plate portion 1. FIG. 4 discloses the positioning of the reinforcing brace 4 upon the upper surface 3 of the plate portion 1. Also, the fastener 16 for holding within the tee slot 13 for securing the brace 4 onto the float, is readily disclosed. FIG. 5 discloses a similar relationship, at a transverse cross-sectional section as taken along the line 5—5 of the previously identified FIG. 3.

Figure 6:
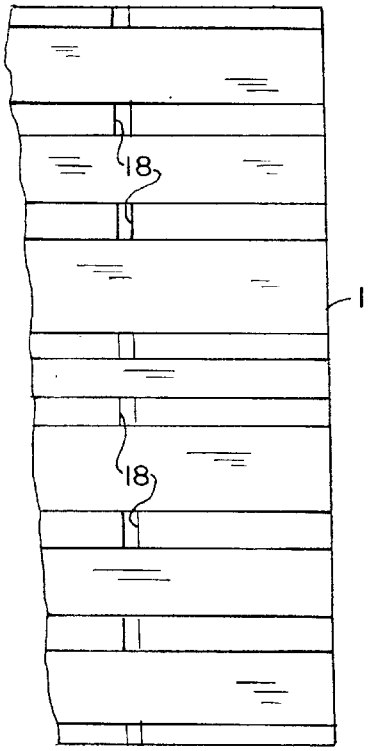
FIG. 6 is a plan view of one end of the bull float of FIG. 1 disclosing the means for beveling the float end.
Figure 7:
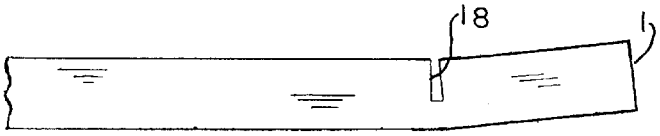
FIG. 7 is a front view of the end of the float as shown in FIG. 6.

FIGS. 6 and 7 disclose the beveling that is provided to the approximate ends of the lengthy bull float, and as can be seen, a series of aligned slots, as at 18, and the formation of the slots at this location provide for a slight bending upwardly, of the extreme ends of the bull float, at both of its ends, as can be seen in FIG. 7, so that when the float is utilized during the finishing of concrete, its ends will not cause any lining to be formed in the finished surface, as a result of the slight elevation provided to the float ends, as can be understood from this disclosure. The upward cant provided integrally of the plate portion 1 is in the vincity of five degrees to furnish adequate clearance for the extreme ends of the float, and reduce their contact with the concrete surface subject to the finishing action.

Figure 8:
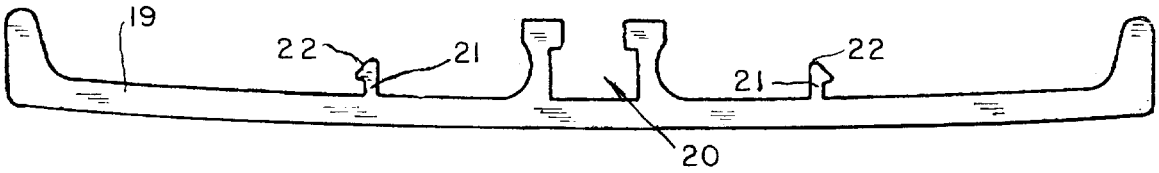
FIG. 8 is an end view of the plate portion of a modified bull float.
Figure 9:
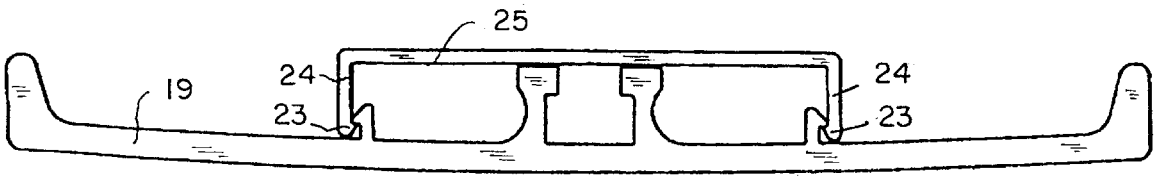
FIG. 9 is an end view of the plate portion of FIG. 8, and also disclosing the reinforcing brace snap locked into position with the ridge means of the said float plate portion.

As previously explained with respect to the assembled float of this invention, as disclosed in FIGS. 1 through 5, the locating of the reinforcing brace upon the upper surface of the float is achieved merely through the positioning by means of the upstanding ridges 8 and 9, for positioning of the brace flanges along the length of the float surface. On the other hand, other means may be provided for assuring an interconnection between the reinforcing brace, and the float, as can be seen in FIGS. 8 and 9. As disclosed, the plate means 19 of the float may contain the integral tee slots, as can be seen at 20, and further extending upwardly from the surface of the float are a pair of ribs, as at 21, and which may be formed having barbed upper edges 22, for accommodating similar type of barb means, as at 23, formed upon the downwardly extending flanges 24 of the reinforcing brace 25, as can be noted. Thus, the reinforcing brace can be initially snap locked into position, with respect to the upper surface of the plate portion of the float, before any fastener means may be accommodated by the tee slot, and extended through the brace, in preparation for its final tightening into assembly.

Figure 10:
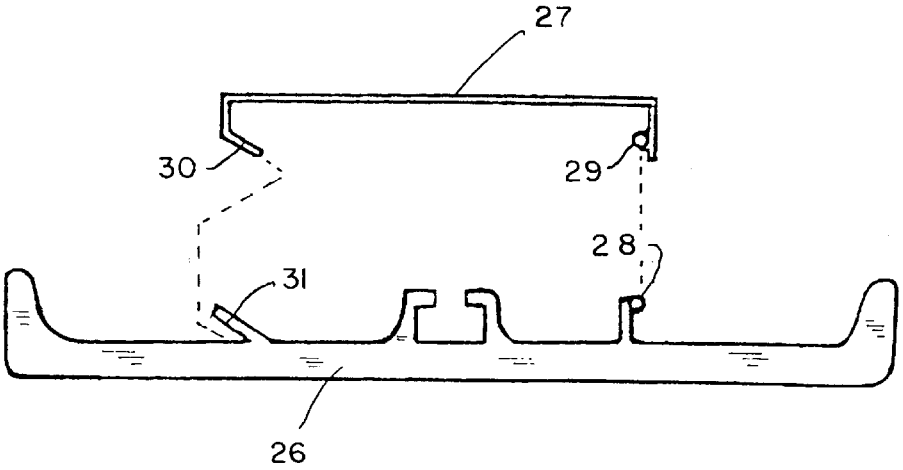
FIG. 10 is an exploded end view of another plate portion of a modified bull float disclosing further a reinforcing brace for pivotally connecting to one edge of the ridge means of the float plate portion.

In addition, FIG. 10 discloses how the plate portion 26 of the float may include means for pivotally connecting of the reinforcing brace 27 onto the upper surface of the float, by interconnecting its mount 28, of the float, with the similar mount 29, of the brace, and then pinning the two together. In the alternative, it is possible that the mount 29 may fit beneath the mount 28, so as to lock these two into connection, and then snapping the angulated flange 30 of the brace about the extending flange 31 of the float, so as to snap fit these components together, during their assemblage, in preparation for usage of the float. These are examples of modifications that may be made to the reinforcing brace, of this invention, and its various interconnecting components, for assuring a snug and tightened fit in its accommodation upon the upper surface of the plate portion of the float, and assure that the various distortions, as previously explained, can be minimized.

Figure 12:
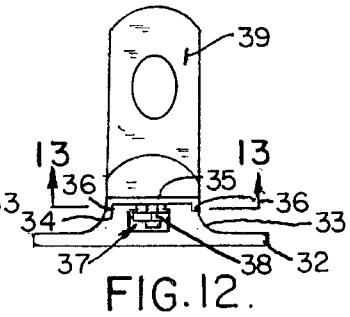
FIG. 12 is an end view of the hand float of FIG. 11, disclosing the interconnection of a handle onto a reinforcing brace and further connected to a tee slot to the plate portion of the said hand float.
Figure 11:
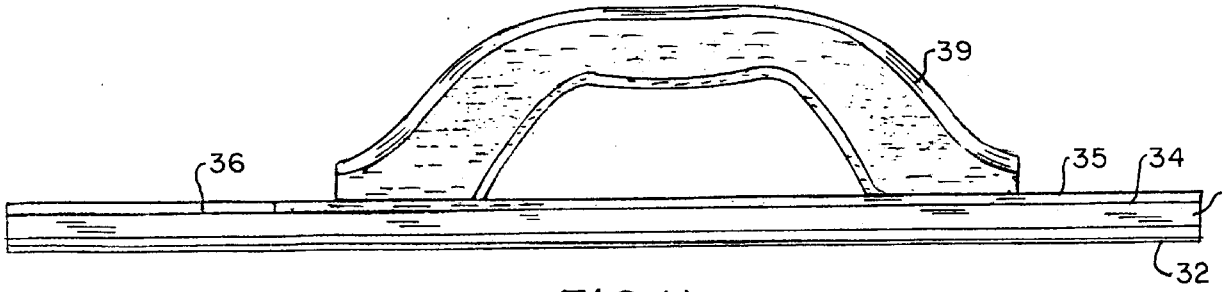
FIG. 11 is a side view of a hand float constructed incorporating a reinforcing brace.
Figure 13:
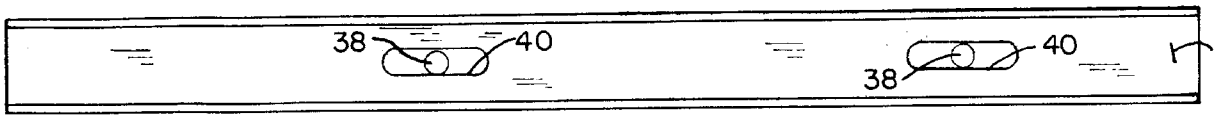
FIG. 13 is a sectional view taken along the line 13—13 of FIG. 12.

FIGS. 11 through 15 disclose how the principle of this invention may be applied to a hand float, to attain its utility within a tool of this construction. As can be seen in FIGS. 11 and 12, the hand float includes a plate portion 32, and which integrally has formed upon its upper surface a raised portion 33. Ridges are formed at 34 at the upper reaches of this portion, and disposed for mating upon these ridges is a slide plate 35. The plate 35 has downwardly extending flanges, on either side, as noted at 36, and formed within the integral raised portion 33 is a tee slot 37, as noted. The tee slot accommodates a fastener, as at 38, which is useful for securement of the brace 35 thereto, in addition to securement of the handle 39. As can be seen in FIG. 13, the brace 35 includes a pair of elongated slots 40 therein, and for accommodating various fasteners 38 therethrough, for securement of handles 39 of differing sizes, that may be applied to the hand float of this invention. The combination of the brace 35, as mounted onto the upper edge of the plate portion 32, is to provide means for assuring the integrity of the length of the hand float, and to aid in resisting against any twisting or distortion, as during repeat usage, as previously explained.

Figure 15:
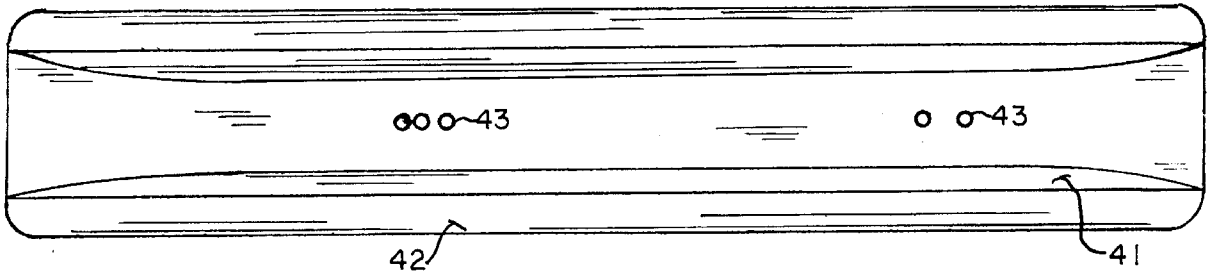
FIG. 15 is a plan view of the plate portion for the hand float as shown in FIG. 14.
Figure 14:
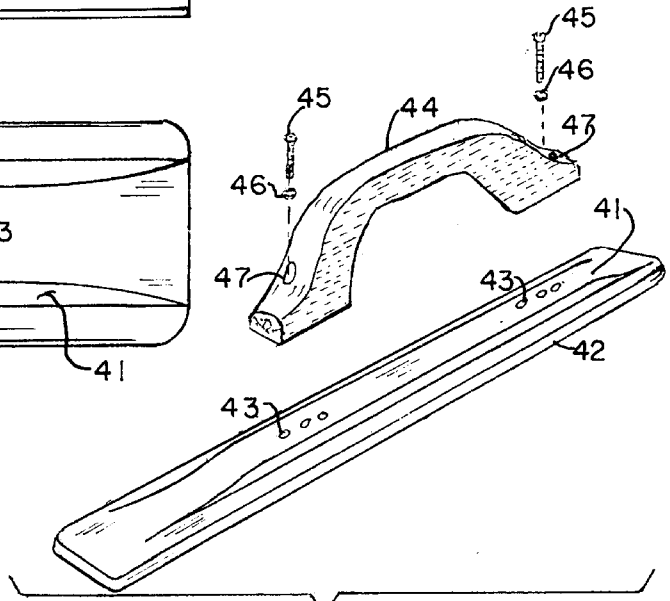
FIG. 14 is an exploded view disclosing the replacement of a handle onto the raised portion of the plate for a hand float, and further disclosing a series of aligned apertures therein for accommodating a handle of differing size.

FIGS. 14 and 15 disclose how various types of apertures may be provided into the raised portion 41 of the float 42, which in this particular instance does not incorporate any reinforcing brace, but the integrity of the raised portion 41 aids in retaining the structural alignment of the float 42, against twisting or distortion. Likewise, a series of aligned apertures, such as the threaded apertures 43, as noted, may be provided, and can accommodate the attachment of handles, such as the one shown at 44, thereto, the handles being of varying sizes, through its attachment by means of the fasteners 45, and their washers 46 through apertures 47 provided at either end of the attachable handle. Thus, handles of differing lengths may be applied to the bull float 42, to facilitate their handling by the concrete finisher, and to provide for ready replacement of a handle, one that may be selected from different sizes, due to the ability of this float to accommodate lengthier handles through the use of the series of aligned apertures as noted at 43.

Figure 16:
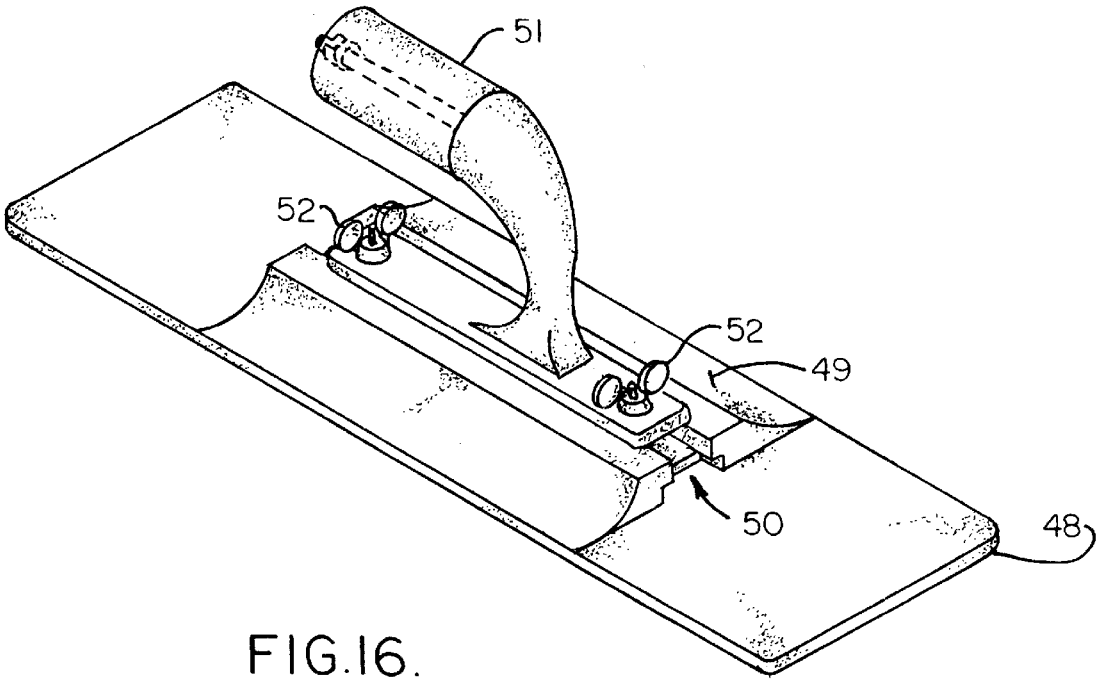
FIG. 16 provides an isometric view of a hand float incorporating an adjustable tee slot for holding a handle.
Figure 17:
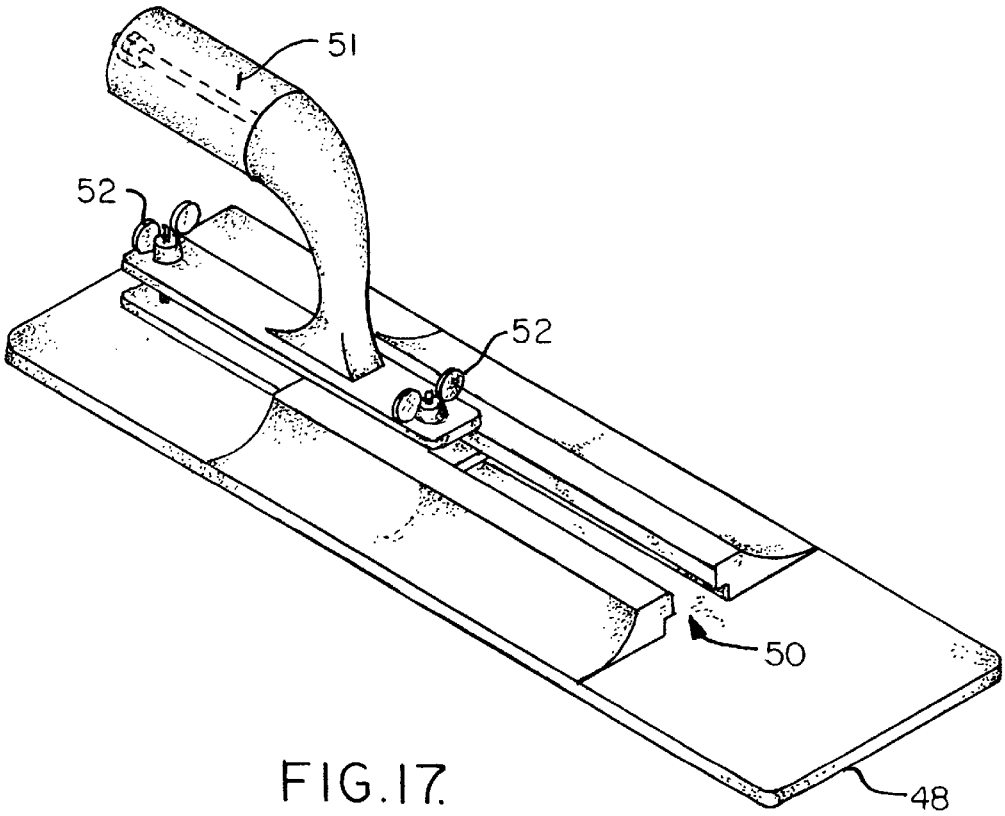
FIG. 17 discloses the hand float of FIG. 16 and showing the handle adjusted for positioning approximate one end of the float to facilitate its usage particularly when leveling fresh concrete under an obstructing structure.

As can be seen in FIG. 16, a hand float generally of the type as previously shown and described in FIG. 12, provides a float 48 having a raised portion 49, and which is formed into a tee slot 50 for accommodating the application of a handle 51 thereon, and applying fasteners 52 cooperating within the tee slot 50, for securing the handle in place. The raised portion 49 of the float, in this particular instance being a hand float, prevents the float from attaining warping, as previously described, and likewise, through the integral formation of its tee slot 50, accommodates the attachment of a handle thereon. In addition, as can be seen in FIG. 17, the handle 51 slay even be slid rearwardly within the tee slot 50 of the float 48, and its fastener 52 secured tightly into position, to lock the handle at an end position, as noted, thereby providing greater length for the hand float to be used when employed for smoothing concrete at rather inaccessible locations, such as under structures, that provide a tight confinement for insertion of the float therein, to achieve concrete movement, and smoothing.

Variations or modifications to the subject matter of this invention may occur to those skilled in the art upon reviewing the disclosure made herein. Such variations or modifications, if within the spirit of this invention, are intended to be encompassed within the scope of any claims to patent protection issuing upon this invention. The description of the preferred embodiments set forth herein are done so for illustrative purposes only.

Having thus described the invention, what is claimed and desired to be secured by Letters Patent is:

1. A float means for finishing concrete, comprising:

an elongated plate portion for applying to a surface of concrete for finishing, said plate portion having an upper surface and upwardly extending locating means comprising a series of ridges extending upwardly from the upper surface of said place portion, and said plate portion also having ends;

a handle connected with the upper surface of the plate portion and disposed for grasping by the user during application of the float means;

a separate reinforcing brace mounted upon the plate portion and positioned by the ridges to the upper surface of the plate portion, said reinforcing brace extending a substantial distance along the entire length of the plate portion and also extending from the center of the plate to at least the midpoint of each half of the plate portion in a widthwise direction and fastened thereto, said reinforcing brace provided for reducing pressure bending and heat distortion of the float means during repeated usage.

2. The invention of claim 1 wherein the ends of the plate portion of the float means are bent upwardly to provide clearance of the plate portion during application of the float means while finishing a concrete surface.

3. The invention of claim 1 and wherein said locating means provided upon the upper surface of the plate portion comprises a series of parallel ridges.

4. The invention of claim 3 and wherein said reinforcing brace comprises an upper wall, said upper wall having side edges, a flange extending downwardly from each side edge of the upper wall of said brace, the flanges cooperating with the parallel ridges of the plate portion to position the reinforcing brace thereon, where by the locating of the reinforcing brace upon the plate portion reduces distortions to the float means during repeated usage.

5. The invention of claim 4 and wherein said flanges of the reinforcing brace are positioned for embracing the parallel ridges of the locating means.

6. The invention of claim 4 and wherein said handle fastens to the reinforcing brace.

7. The invention of claim 6 and further including a tee slot provided integrally upon the upper surface of the plate portion, and fasteners cooperating with the tee slot and through the reinforcing brace for securing the brace to the plate portion of the float means.

8. The invention of claim 7 and wherein said float means comprises a bull float.

9. The invention of claim 8 and wherein said handle comprises an elongated handle to facilitate manipulation of the bull float from a distance.

10. The invention of claim 9 and wherein said handle is adjustable.

11. The invention of claim 7 and wherein said float means comprises a hand float.

12. The invention of claim 11 and wherein said handle connects to the reinforcing brace.

13. The invention of claim 12 and wherein said handle is secured by fasteners to said reinforcing brace.

14. The invention of claim 7 and wherein said fasteners further secure the handle to the tee slot.

15. A float means for finishing concrete, comprising:

an elongated plate portion for applying to a surface of concrete for finishing, said plate portion having an upper surface and having upwardly extending locating means comprising a series of ridges extending upwardly from the upper surface of said plate portion, and said plate portion also having ends;

a handle connected with the upper surface of the plate portion and disposed for grasping by the user during application of the float means;

a separate reinforcing brace mounted upon the plate portion and positioned by the ridges to the upper surface of the plate portion, said reinforcing brace extending a substantial distance along the entire length of the plate portion and fastened thereto, said reinforcing brace provided for reducing pressure bending and heat distortion of the float means during repeated usage;

the ends of the plate portion of the float means are bent upwardly to provide clearance of the plate portion ends during application of the float means while finishing a concrete surface, the upwardly extending locating means of the plate portion have aligned transversely arranged slots provided therethrough, approximately inwardly from the plate portion ends, to accommodate the upward bending of the ends for furnishing the float means clearance during its application upon the surface of any concrete to be finished.

*16. A float means for finishing concrete, comprising:*

*a bull float, said bull float including an elongated plate portion having a substantially flattened bottom forming a concrete contacting surface, said bull float for application to a surface of concrete for finishing, said plate portion having an upper surface, and said plate portion also having ends;*

*a lengthy handle connected to the upper surface of the plate portion and disposed for grasping by the user during distant application of said bull float;*

*the ends of said plate portion of the bull float are bent upwardly to provide clearance of the plate portion during application of the bull float while finishing a concrete surface, while providing a smooth finish to the concrete surface without causing any lining as the bull float is moved in various directions during finishing of the surface of fresh concrete;*

*said float means including a pair of upstanding front and rear edges integrally formed with the plate portion and extending from end to end thereof, said upstanding front and rear edges being useful for facilitating the movement of concrete around the surface of the freshly poured concrete, during the finishing of a concrete surface; and said plate portion, inwardly from its ends, has slots formed extending from the front and rear edges of the plate portion, and said ends of the plate portion being bent proximate said slots to provide said upward bends furnishing clearance for the plate portion during application of the bull float while finishing a concrete surface.*

* * * * *